United States Patent [19]
Raymond et al.

[11] Patent Number: 6,108,697
[45] Date of Patent: Aug. 22, 2000

[54] ONE-TO-MANY DISK IMAGING TRANSFER OVER A NETWORK

[75] Inventors: Robert S Raymond; Blaine S Dennis, both of Orem; Eric J Ruff, Springville, all of Utah

[73] Assignee: PowerQuest Corporation, Orem, Utah

[21] Appl. No.: 09/165,532

[22] Filed: Oct. 2, 1998

Related U.S. Application Data

[60] Provisional application No. 60/061,127, Oct. 6, 1997.

[51] Int. Cl.[7] .................................................. G06F 13/00
[52] U.S. Cl. ........................ 709/218; 709/231; 709/329; 713/2
[58] Field of Search ................................. 709/204, 217, 709/218, 230, 231, 232, 236, 250, 319, 328, 329; 713/1, 2

[56] References Cited

U.S. PATENT DOCUMENTS

| | | | |
|---|---|---|---|
| 4,503,533 | 3/1985 | Tobagi et al. | 370/85 |
| 4,958,283 | 9/1990 | Tawara et al. | 364/413.13 |
| 5,201,045 | 4/1993 | Pflueger et al. | 395/575 |
| 5,231,633 | 7/1993 | Hluchyj et al. | 370/94.1 |
| 5,438,671 | 8/1995 | Miles | 395/200 |
| 5,537,592 | 7/1996 | King et al. | 395/600 |
| 5,604,906 | 2/1997 | Murphy et al. | 395/712 |
| 5,638,521 | 6/1997 | Buchala et al. | 395/311 |
| 5,659,614 | 8/1997 | Bailey, III | 380/4 |
| 5,675,769 | 10/1997 | Ruff et al. | 395/497.04 |
| 5,706,472 | 1/1998 | Ruff et al. | 395/497.04 |
| 5,724,355 | 3/1998 | Bruno et al. | 370/401 |
| 5,758,165 | 5/1998 | Shuff | 395/712 |
| 5,812,790 | 9/1998 | Randall | 395/200.77 |
| 5,848,192 | 12/1998 | Smith et al. | 382/232 |
| 5,852,713 | 12/1998 | Shannon | 395/182.04 |
| 5,857,072 | 1/1999 | Crowle | 709/203 |
| 5,907,672 | 5/1999 | Matze et al. | 395/182.06 |

OTHER PUBLICATIONS

Norton Ghost Competitive Matrix, no later than Jun. 4, 1999.
RapiDeploy from Altiris lets you sleep tonight, no later than Jun. 3, 1999.
"RapiDeploy", PC Magazine, May 4, 1999.
"Performance Tests", PC Magazine, May 4, 1999.
"Drive Image 2.0". PC Magazine, May 4, 1999.
"ImageCast IC3"PC Magazine, May 4, 1999.
"Verlustlos", 1995.
Japanese Patent Abstract, publication No. 04137126, published Dec. 5, 1992.
A. Tanenbaum, *Computer Networks*, 3d. Ed. (1996), pp. 370–395,431, 432.
DriveCopy™ press release, Feb. 20, 1997.
Release notes for version 1.1 of the Squid cache, Apr. 28, 1997.
The Multimedia Multicasting Problem, Feb. 1996.
Multicast Services, May 6, 1998.

(List continued on next page.)

*Primary Examiner*—Viet D. Vu
*Attorney, Agent, or Firm*—Computer Law++

[57] ABSTRACT

Methods, systems, articles of manufacture, and signal formats are provided for transferring disk images from a transmitting computer to one or more downloading computers. The transfer is done in a manner that allows a technician to start the download to one computer while preparing a second computer for downloading or shutting down a third computer after it has finished downloading the disk image. The computers need not wait for the beginning of a data stream but can instead join the download at specified points within the data stream. This reduces the time spent waiting to begin the download, particularly when the disk image being transferred is large. Compression and connection selection may be performed in response to changes in network performance. Image file packing and error management techniques may also be used, as well as on-the-fly file system instance manipulations.

51 Claims, 3 Drawing Sheets

OTHER PUBLICATIONS

A Reliable Multicast Protocol Using Round–robin and Selective Retransmission, 1994.

The Computer Cloning Problem–Solution, no later than Oct. 1, 1998.

"New Episode In Clone Wars", Nov. 1998.

ImagaCast IC3, Nov. 1998.

FlashClone 1.1, Nov. 1998.

Norton Ghost 5.0e, Nov. 1998.

RapiDeploy 3.3 but, Nov. 1998.

DiskClone Corporate 1.0, Nov. 1998.

PowerQuest sharpens Drive Image Pro, May 4, 1998.

KeyLabs Announces Support for IP Multicast in LabExpert and RapiDeploy, Jul. 7, 1998.

ImageBlaster, Nov. 1998.

ONE-TO-MANY DISK IMAGING TRANSFER OVER A NETWORK

RELATED APPLICATIONS

The present application claims priority to commonly owned copending U.S. patent application Ser. No. 60/061,127 filed Oct. 6, 1997.

FIELD OF THE INVENTION

The present invention relates to the transfer of computer disk images between computers, and more particularly to round-robin multicasting of disk images with selected join points.

TECHNICAL BACKGROUND OF THE INVENTION

It is often useful to copy computer hard disk partitions. This may be done to create archive copies, for instance, or to configure additional storage devices using one device as a model. Backup programs are available to copy every file in a partition, every file in a group of partitions, or every sector (used or not) on a source disk to a target device such as a secondary disk or a tape drive. The target device may be located either on the same computer or on a connected computer such as a file server. By restoring data from the backup to a different computer, one can use the backup program as an "imaging" or "cloning" program to copy entire disk images from one computer to another. However, backup programs are not usually designed to copy a disk image to several machines at the same time.

As discussed below, the ability to efficiently create many copies of an image is important to system integrators, training centers, and other businesses. To help address this need, various imaging programs are now available which copy a source disk drive to multiple target drives subject to constraints that are discussed below and elsewhere. Generally, imaging programs allow one or more partitions to be copied. Some imaging programs create a copy of every file found in the specified source partition(s), while other programs allow the user to select which files to copy.

Some imaging programs store the copied data in an "image file," while others perform imaging directly to create new disk images without using an intermediate image file. The data may be compressed prior to being placed in the image file, and then decompressed while creating a new disk image. Compression operates on the data being stored to reduce its redundancy and hence allow it to be stored in a smaller space.

Regardless of whether the data is compressed, an image file packs and/or modifies or supplements the data in some fashion, putting it in a form which is more convenient or efficient for storage and transport. "Working" partitions contain files organized according to a standard file system format, such as the format used by NTFS, FAT, HPFS, Linux, or another familiar file system. An image file may be stored in a working partition as a file.

However, when viewed as a collection of files, image file contents do not necessarily follow standard file system formats. An image file may contain partial or complete contents from one or more other files from one or more partitions; for convenience, these are referred to here as "imaged files." The imaged files are not necessarily stored in the image file in a standard file system format. Standard file system software (as opposed to disk imaging software) can read the contents of an image file but cannot properly distinguish between the individual imaged files. A working partition generally follows one or more rules such as allocation in sector units, alignment of sectors on cluster boundaries, specific directory or file allocation table formats, and support for fragmented files. Image file contents may violate one or more of these rules with regard to the imaged files.

One type of image file, which is used by imaging programs that proceed on a file-by-file basis, stores the contents of each imaged file contiguously (thereby providing no support for fragmentation). One variation also ignores cluster alignment by packing together the sectors of imaged files. Another variation goes even further by sometimes ignoring sector boundaries; this allows the imaging software to pack the bytes of more than one imaged file in a given sector when the end of an imaged file lies within a sector. To create a working partition on a target disk, sector allocation and cluster alignment must be restored when the imaged file contents are copied to the target disk.

Another type of image file, which is used by imaging programs that proceed on a sector-by-sector or cluster-by-cluster basis, packs together the clusters or sectors of data. As a result, the cluster numbers or other pointers in file system structures in the image file do not always point to the current (packed) location of the data clusters in question. The clusters must be unpacked and restored to their expected relative locations when data from the image file is copied to the target disk to create a working partition there.

Imaging programs and image files have many uses for system integrators, training centers, testers, and others. Training centers use imaging and image files to recreate disk environments suited to particular lessons. For instance, one lesson may require a Microsoft Windows NT environment, while another requires a Linux environment and a third requires a Novell NetWare environment. (WINDOWS NT is a mark of Microsoft Corporation; NETWARE is a mark of Novell, Inc.) Testers also use imaging and image files. For instance, a maker of peripheral equipment may use different restored images to test its devices and device drivers in different operating environments.

Because the experiences of system integrators illustrate many aspects of the current state of imaging multiple computers, we now consider in greater detail the working environment of an integrator. A system integrator is in the business of reselling computers to companies or corporations. When a large corporation places an order it usually standardizes on a configuration and purchases a large quantity, both to get a better price and to meet the needs of many users within the company. The integrator's job is to order in all the computer hardware and software, configure it all, and then ship it to the customer. This involves ordering in the computers, peripheral hardware, and software, and then installing or assembling all these pieces and shipping the configured computers to the customer. This may be done in different ways, but an important goal is to make the imaging process more efficient and less costly in terms of technician time and other resources.

According to an approach we shall call Approach One, a technician installs each software package on each of the computers using the same process as an end user who installs software infrequently. The technician must stay at the target computer to answer the install software's questions. The target computer reads the data from a floppy or a CD-ROM, both of which are relatively slow devices. There is little or no opportunity to make the installation proceed on more than one computer at a time.

Under Approach Two, the technician configures the first computer and then saves an image of the configured disk on a CD-ROM. Rather than re-install each desired software package on each subsequent computer, the technician need only copy the disk image from the CD-ROM to the disk drive of the next machine and everything on the target machine should then work as desired. This is a great improvement over having the technician sit and re-install all the software on each machine. But one drawback is that, in order to get several of these installations happening at one time, one needs several CD-ROMs, tape cartridges, or other high capacity removable media (one for each target machine).

Under Approach Three, the integrator puts the disk image out on a network and has multiple computers downloading the image from the server at the same time. The technician can move from workstation to workstation opening packages and setting up, starting the process of connecting to the server and copying the disk image from the network, and then moving on to the next workstation. The technician can also move from machine to machine to provide overlap while disconnecting machines from the server and shutting down the machines before boxing them for shipment. However, each machine has a separate conversation with the server. Thus, if there are too many computers downloading at once, the speed of the network can become a serious bottleneck because the multiple conversations consume the available bandwidth.

Approach Four overcomes the network bottleneck created when many workstations individually download the disk image. This fourth approach has one workstation request the image and allows multiple workstations to "listen" to that conversation. Each listening workstation makes its own copy as the image goes over the network from the server to the sole requesting workstation. This significantly reduces the network traffic.

However, in order for several workstations to listen to the one conversation using a broadcast technology or a multicast technology, all of the computers must be previously configured and each must be waiting and watching for the beginning of the download. Also, they all finish at the same time, so it is not possible for the technician to overlap the process of shutting down and boxing the workstations.

Accordingly, it would be an improvement to provide new systems, devices, and methods for transferring a disk image to multiple machines in a way that improves the opportunity for overlap without requiring additional cartridges or network bandwidth.

In particular, it would be useful to improve overlap between machines both in the process of downloading a copy of the image from a network and in the processes of setting up and shutting down machines before and after a download.

Such improvements are disclosed and claimed below.

BRIEF SUMMARY OF THE INVENTION

The present invention provides novel methods, systems, and devices for imaging disks and other storage media; disks are used as an illustrative example but CDs, tapes, and other storage media may likewise be used according to the invention. Although the invention may be enhanced by use of otherwise familiar techniques and tools for image creation, partition manipulation, data compression, and multicasting, the invention is not limited to such techniques and tools.

One method of the invention includes repeatedly transmitting a disk image and configuring multiple workstations by listening to at least one repetition. The invention uses simultaneous transmission of image data in a circular, ring buffer, round-robin or other repeating fashion so that new workstations can come "online" and begin receiving the image data in the middle of the data stream. A given workstation continues listening until the data stream rolls around to the beginning again and on to the point at which the workstation began downloading packets.

This approach allows multiple workstations to "listen" to one conversation without requiring that all workstation downloads start and end together. A technician can take a target computer out of the box and immediately begin the copy process, thus requiring less setup time than approaches that require all computers be set up to begin downloading at the same time. The invention also facilitates the take down process; the computers will finish imaging in a staggered manner, so the technician can box up each completed computer and then move to the next one.

Packets can be lost on the network and the participating workstations need not use guaranteed-delivery packet protocols to insure the data is correct. Instead, each workstation can verify which sectors were received and then request (or listen for the next repetition of) only those packets that were not received from the original data stream. If several packets are lost on the network, the networking protocol does not need to guarantee their retransmission. The "listening" workstation can verify transmission success or failure based on whether a required sector has been received and written to disk. That is, the invention may use disk writes and disk addresses to verify network data transmissions.

The invention allows transfer of a disk image with or without an image file. For instance, one method assumes the disk image is stored in an image file. The image file may be kept on a server, at a local or remote workstation, or at another location. Another method assumes limited storage space for image files, so the disk image is uploaded to the network directly from a configured disk instead of being read from an image file. The imaging software sends the data stream out as it is being read from the configured disk. Alternatively, the imaging software reads the data stream from the configured disk and then creates an image file on-the-fly and sends it to the target disks, and possibly sends it back as well to a storage device for later use.

The invention also allows transfer of a disk image to and from various locations. The upload to the network may be done by a server or by a client. A computer may configure one of its own disks by sending packets to itself; other computers may listen in and likewise download the disk image. The network may use local area network addresses, universal resource locators ("URLs"), or other addresses to specify the network connections that serve as sources and targets for imaging. Other features and advantages of the present invention will become more fully apparent through the following description

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention aids the task of transferring a disk image between computers in a network. Illustrative embodiments of systems, methods, and articles of manufacture according to the invention are described below. Discussion begins with the network environment generally, and proceeds in turn to specific computers, transmission and downloading methods, and transmission signal formats. However, it will be appreciated that many aspects of the description of methods or signal formats of the present invention extend to corresponding apparatus and articles, and that the description of apparatus and articles of the present invention extends likewise to corresponding methods and signal formats.

Networks

Users sometimes need to transfer a disk image from one location to several locations. A user may be a person, or it may be a software task or agent or other computer process acting legitimately on behalf of a person. The locations involved may be on different disks attached to the same computer, or on different disks attached to two or more different computers.

Figure 1:
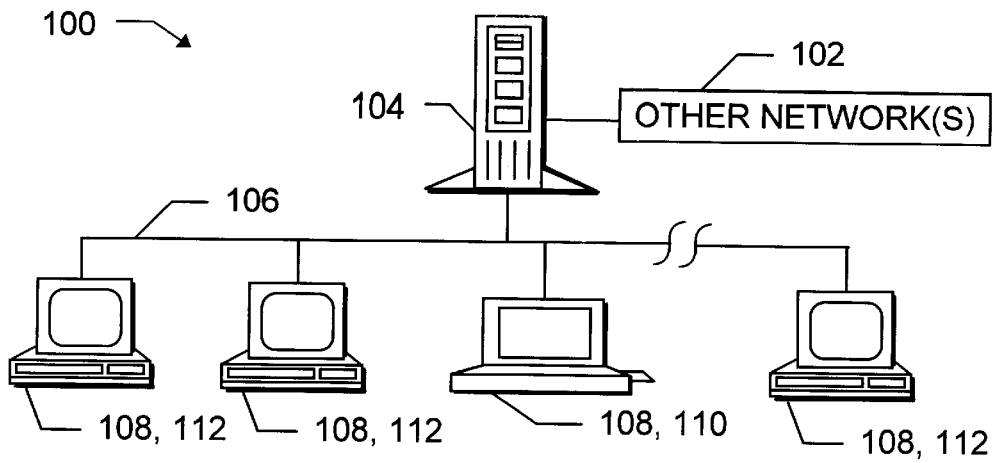
FIG. 1 is a diagram illustrating one of many possible computer networks suitable for use according to the present invention.

In the latter case, the computers involved may communicate through a network connection. As used here, a "network connection" may be a "wire" as defined below, a dial-up link, a portable link such as an infrared link, and/or intermediate files of various formats. FIG. 1 illustrates a network 100 which is one of the many possible networks suitable for adaptation and use according to the present invention. The network 100 may be connectable to other networks 102, including LANs or WANs or portions of the Internet or an intranet, through a gateway or similar mechanism, thereby forming a larger network which is also suitable for use according to the invention.

The illustrated network 100 includes a server 104 connected by network signal lines 106 to one or more network clients 108. Other suitable networks include multiserver networks and peer-to-peer networks. The server(s) 104 and clients 108 may be uniprocessor, multiprocessor, or clustered processor machines. The server(s) 104 and clients 108 each include an addressable storage medium such as random access memory and/or a non-volatile storage medium such as a magnetic or optical disk, ROM, bubble or flash memory.

Suitable network clients 108 include, without limitation, personal computers; laptops 110, personal digital assistants, and other mobile devices; and workstations 112. The signal lines 106 may include twisted pair, coaxial, or optical fiber cables, telephone lines, satellites, microwave relays, modulated AC power lines, RF connections, and/or other data transmission "wires" known to those of skill in the art. The network connections 106 may embody conventional or novel signals, and in particular, may embody a novel series of data stream repetitions as discussed herein.

The server(s) 104 and many of the network clients 108 (or peers 108 in a peer-to-peer network) are often capable of using floppy drives, tape drives, optical drives or other means to read a storage medium. A suitable storage medium includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices.

The physical configuration represents data and/or instructions which cause the computer system 100 to operate in a specific and predefined manner as described herein. Thus, the medium tangibly embodies a program, data, functions, and/or instructions that are executable by the servers and/or network client computers to support disk image transfers substantially as described herein. Suitable software and hardware implementations according to the invention are readily provided by those of skill in the art using the teachings presented here and programming languages and tools such as Java, Pascal, C++, C, assembly, firmware, microcode, PROMS, and/or other languages, circuits, or tools.

Overview of Individual Computers

Figure 2:
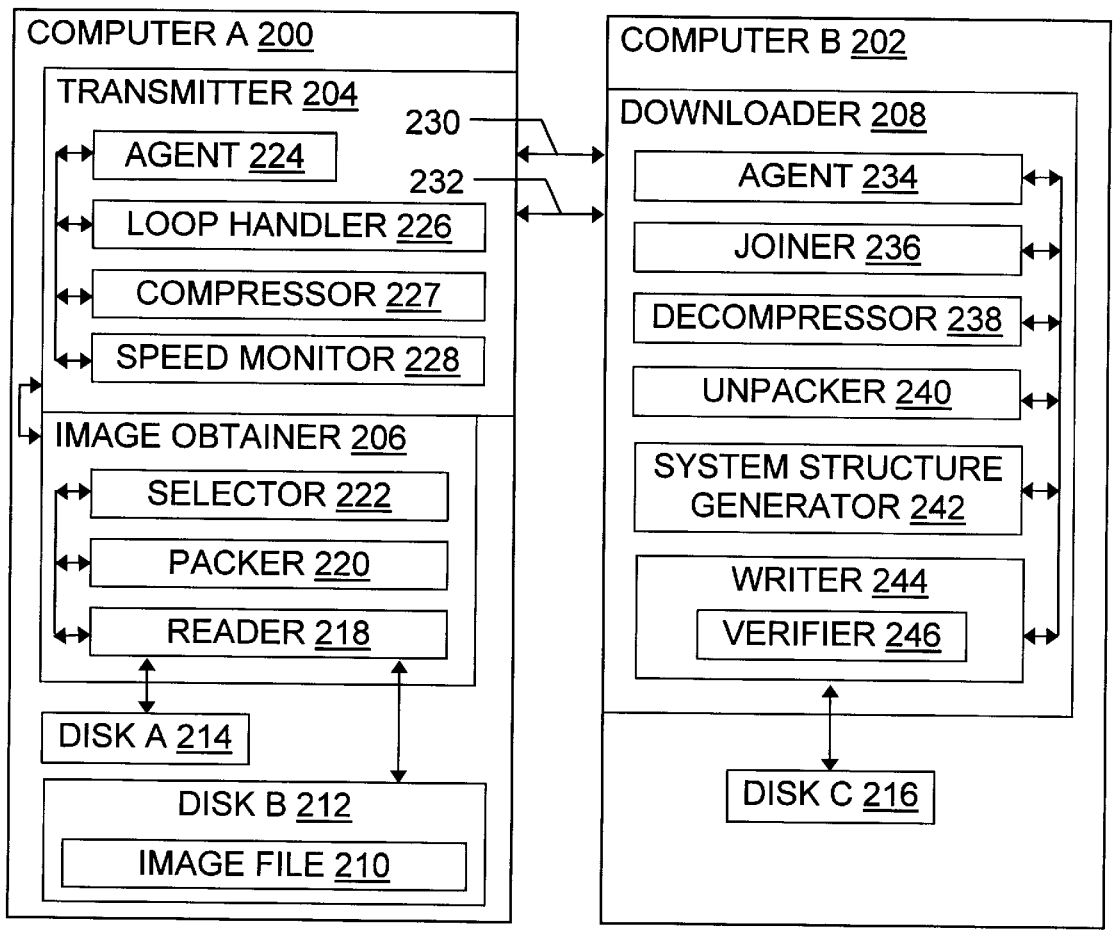
FIG. 2 is a diagram illustrating two computers in a network configured for use according to the present invention.

FIG. 2 illustrates two computers, 200 and 202, which are configured for disk image transfers according to the present invention. Aspects of the computers 200, 202 are also discussed below in connection with FIGS. 3 through 5.

The computer 200 is a transmitting computer, while the computer 202 is a downloading computer. These roles may be filled in various ways. Those of skill in the art will assign roles to particular computers according to criteria such as the current location of the disk image to be transferred, the desired location(s) of copies of the disk image, available network connections 106, and software license restrictions.

For instance, the transmitting computer 200 will often be a server 104, but it may also be a client or peer computer 108. The downloading computer 202 will often be a client 108, but it may also be a peer 108 or a server 104. The transmitting computer 200 and the downloading computer 202 will often be distinct machines, but they may also be the same machine when a disk image is transferred from one disk to another disk on that same machine. In general, there will be one transmitting computer 200 and two or more downloading computers 202 in the system 100.

The transmitting computer(s) 200 each include a transmitter 204 and an image obtainer 206. Each downloading computer 202 includes a downloader 208. These components 204, 206, and 208 may be implemented using general purpose computer hardware (processor, memory, I/O devices) configured with software according to the invention. Alternatively, the components 204, 206, and 208 may be implemented using special purpose hardware such as application-specific integrated circuits or field programmable gate arrays, in combination with software. For ease of illustration, components such as user interfaces, operating systems, file systems, and networking software are not shown expressly in FIG. 2, but those of skill in the art will appreciate how to combine and use such components according to the teachings herein.

Figure 5:
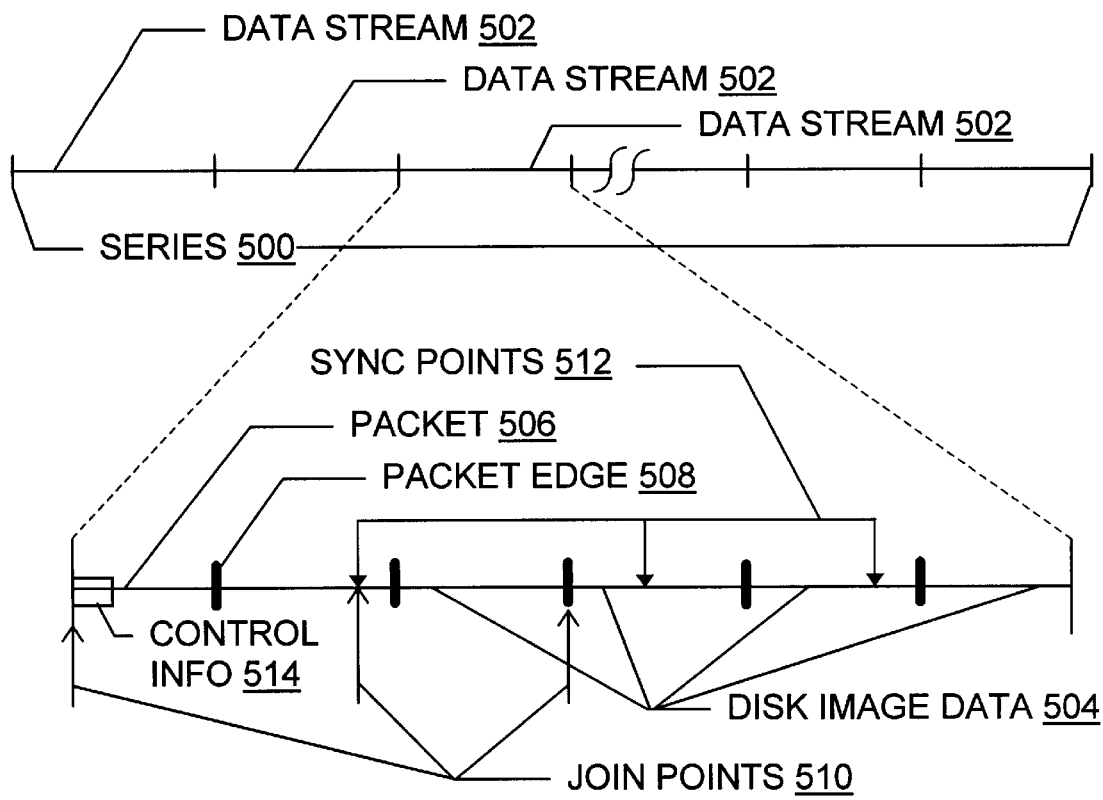
FIG. 5 is a diagram illustrating signal components of repeated data streams according to the present invention.

The transmitter 204 transmits repetitions of a data stream containing a disk image; data streams are discussed further in connection with FIG. 5 and elsewhere. At this point it is enough to note that the data stream signal includes the disk image data plus join points. A given downloading computer 202 is able to determine when it has obtained all the information in the disk image, even if the computer 202 in question began downloading information in the middle of a data stream repetition. The transmitter 204 is discussed in greater detail below.

The image obtainer 206 obtains the disk image and provides it to the transmitter 204. The image may be obtained either from an image file 210 stored on a disk 212, or directly from a disk 214 without use of an intervening image file. The image obtainer 206 and image files 210 are discussed in greater detail below.

The downloader 208 listens to the repeating data streams from the transmitter 204, joins at an appropriate point (which may be in the midst of a repetition), downloads data through zero or more successive repetitions as needed to get a complete copy of the disk image, and stores the disk image on a target disk 216. The downloader 208 performs image file unpacking, data decompression, and error handling as needed. The downloader 208 is discussed in greater detail below.

Image Obtainer

As noted, the image obtainer 206 obtains the disk image and provides it to the transmitter 204. The image may be obtained either from the image file 210 or directly from a disk 214 without use of an intervening image file (of course, nothing prevents the disk 214 from itself containing image files whose contents are treated the same as other file contents rather than as image files). As noted, references to a "disk" are simply for convenience and to provide one example. Other storage devices such as CD-ROMs or tapes or even memory modules may also be used, with appropriate modifications for differences such as linear versus random accessibility and the presence or absence of sector allocation requirements.

The image file 210 may be structured according to a format that is known in the art, or the image file 210 may use a novel format such as that described in commonly owned copending U.S. patent application Ser. No. 09/134,883 filed Aug. 15, 1998; that discussion of image files and their uses is incorporated herein by reference. For purposes of the present invention, it suffices to note that the image file is not a working partition. Thus, if the image file 210 is in a file-by-file format, it may be byte-aligned, without free space, and with differently formatted directory information than in a working partition. Likewise, if the image file 210 is in a cluster-by-cluster format, then clusters in the image file 210 may be packed, while those on the disk 214 are not. That is, image file 210 directory clusters refer to other clusters by cluster number or other addresses which are generally correct only after the image file contents have been unpacked to place the clusters in their original locations relative to one another. Unpacking either type of image file 210 may introduce unused space; image files generally avoid storing unused bytes, sectors, and/or clusters.

In one embodiment, the image obtainer 206 includes a reader 218, a packer 220, and a selector 222. In alternative embodiments, the packer 220 and/or the selector 222 are omitted.

In general, the image file 210 may be stored using a file system such as the Microsoft Windows NT file system ("NTFS"), the Novell NetWare file system ("NFS"), or other file systems (WINDOWS NT is a mark of Microsoft corporation; NETWARE is a mark of Novell, Inc.). Accordingly, the reader 218 may use standard NTFS, NFS or other standard file system calls when reading the image file 210. Alternatively, the reader 218 may use information about the directory and file structures of a specific file system to read the image file 210 in a more efficient manner (such as with sustained elevator seeks) than would be likely with the standard file system calls.

By contrast, when reading the disk 214 which is to be imaged without the intervening on-disk image file 210, the reader 218 preferably uses low-level calls such as sector reads rather than using higher-level standard file system calls. This allows the reader 218 to read all sectors, including those containing file system structures such as partition tables and boot records and directories that would otherwise be filtered or hidden by the standard file system calls.

In one embodiment, the packer 220 discards unused bytes, sectors, or clusters of the disk 214 that are read by the reader 218; in another embodiment the reader 218 avoids reading unused bytes, sectors, or clusters of the disk 214. In either case, as well as in a combination of the two, the packer 220 and/or reader 218 create an image file on-the-fly. The packer 220 packs the used bytes, sectors, or clusters together for transmission by the transmitter 204. Like the use of the pre-existing image file 210, the use of an on-the-fly image file reduces the amount of data to be transmitted to the downloading computers 202. On the other hand, some embodiments of the image obtainer 206 omit the packer 220 and simply send every byte, sector, or cluster of the selected partitions from the disk 214 to the transmitter 204.

The selector 222 may be used (with or without the packer 220) to further select which data is imaged. Selection may include or exclude specific partitions and/or specific files. For instance, in one embodiment, the selector 222 obtains from the user a list or other specification of which file(s) to image. This may be done by having the user specify the files expressly, or by having the user specify which files should not be imaged. The specification may be obtained in terms of individual files, or in terms of directories or directory subtrees. The selection code may support keyword searches, wildcards in file names, and other familiar file system interface techniques.

The selector 222 and/or reader 218 refers to the file system structures of the disk 214 or image file 210 to determine which clusters or sectors need to be read from the source and sent to the transmitter 204. The image obtainer 206 also sends the transmitter 204 corresponding partition and file system information. If the selector 222 was used, then the file system information may be a subset of the information in the image file 210 or on the disk 214, reflecting the fact that not all files, file contents, or directories have been copied. In particular, one embodiment copies predetermined directory entries but does not copy or transmit the corresponding file contents. This is used, for instance, to create a directory entry for a virtual memory or swap file on the target without spending the resources to copy the source virtual memory or swap file.

The target partition information may be the same as the partition information stored in the source 214. If the source is a file-by-file image file 210, then the source does not necessarily contain partition information. The partition may be resized on-the-fly or a differently sized target partition may be created, either to decrease partition size to reflect the presence of fewer files or a decrease in the amount of free space desired, or to increase partition size in response to available free space on the target that would otherwise not be immediately usable by the file system in the target partition. Cluster size may also be changed, either by an on-the-fly manipulation or by creating a target partition having a different cluster size than the source. Suitable on-the-fly partition manipulations are described in commonly owned copending U.S. patent application Ser. No. 09/134,883 filed Aug. 15, 1998; that discussion is incorporated herein by reference.

Transmitter

The transmitter 204 transmits repetitions of a data stream signal containing the disk image data provided by the image obtainer 206. Data stream formats are discussed below in connection with FIG. 5 and elsewhere. In one embodiment, the transmitter 204 includes an agent 224, a loop handler 226, and a dynamic speed monitor 228. In alternative embodiments, the agent 224 and/or the speed monitor 228 are omitted.

Transmission may be initiated in response to commands from a user interface, or transmission may be started automatically by the agent 224 in response to a request from one or more downloading computers 202. Interrupts, UNIX-style signals, remote procedure calls, remote message interfaces, events, and other familiar mechanisms may be used to request or require that the agent 224 initiate transmission.

The loop handler 226 performs several functions, including: (a) determining the timing and number of data stream repetitions; (b) combining descriptive and control information with the disk image to form a given data stream signal; and (c) transmitting the data stream repetitions.

The number of repetitions of a given data stream may be a default such as the number used last time, or a predetermined number, such as ten. Alternatively, the number of repetitions may be determined using heuristics, acknowledgments, or commands. For instance, the number of repetitions R may be set to C*TC/TR, where C is the number of computers 202, TC is the approximate time required to set up a given computer 202 to receive the download before moving to the next computer 202 to set it up, and TR is the approximate time needed to transmit one repetition. Alternatively, the loop handler 226 may continue repeating data stream transmissions until an acknowledgment is received from every computer 202 (if all computers 202 are known to the transmitting computer 200 or if the number of computers 202 is known) or until a predetermined time has passed without additional acknowledgments, or simply until it is instructed by the user to stop.

The descriptive and control information placed in the data stream by the loop handler 226 is discussed in connection with FIGS. 3 and 5. It suffices here to note that the data stream contains (a) the disk image being transferred; (b) descriptive information such as the size of the disk image or the image's source location and timestamp; and (c) control information such as download join points, compression sync points, the address of alternate network connections, and error management bits. "Error management bits" such as checksums, cyclic redundancy codes, and other error detection and/or error correction bits may also be inserted, read, and acted upon by lower level networking software and/or hardware.

The loop handler 226 also transmits the data stream repetitions over at least one network connection 230. The term "network connection" includes LAN and Internet and other connections, including the "wires" 106. In some embodiments, the data stream may be transmitted over one or more additional network connections; for ease of illustration only one additional connection 232 is shown. For instance, the disk image may be transmitted over a high capacity connection 230 such as an Ethernet wire while the control and/or descriptive information is transmitted over a lower capacity wire 232 such as a serial connection. The second connection 232 may be used to retransmit missing bytes, sectors, or clusters. The second connection 232 may also be used only in the event that the first connection 230 becomes unavailable. The connections 230, 232 themselves may include any of the "wires" defined above or other communication links, as well as networking software using TCP/IP and/or other available protocols. Note that some network protocols allow both connections 230, 232 to coexist on the same wire.

A compressor 227, if present, performs data compression under the direction of the loop handler 226 and/or the dynamic speed monitor 228. Suitable data compression techniques and mechanisms include, without limitation, run-length encoding, differential encoding, original or adaptive Huffman coding, dictionary compression methods, and others familiar in the art. In alternative embodiments, compression is handled directly by the loop handler 226 and/or the dynamic speed monitor 228 instead of by a separate compression module 227.

The dynamic speed monitor 228 detects and responds to changes in network connection 230 performance. Performance is monitored by conventional tools for tracking throughput, reliability, latency, and/or other performance characteristics.

In some embodiments, the speed monitor 228 regulates data compression by invoking or terminating data compression and/or modifying the data compression level and/or selecting a different data compression method when it detects a change of predetermined amount in the performance of the network connection 230.

In some embodiments, the speed monitor 228 selects between two or more connections (such as the connections 230, 232) in response to predetermined events that indicate changes in relative network connection performance. For instance, the monitor 228 may initially select a lower speed connection 106 which tends to receive fewer demands and switch to a higher speed connection 106 when the user increases the transmission priority or when demands on the higher speed connection decrease. Of course, the speed monitor 228 may also use combinations of connection selection and data compression.

Downloader

The downloader 208 listens to the repeating data streams from the transmitter 204, joins at an appropriate point (which may be in the midst of a data stream repetition), downloads data through zero or more successive repetitions as needed to get a complete copy of the disk image, and stores the disk image on the target disk 216. As discussed below the downloader 208 performs image file unpacking, data decompression, and error handling as needed.

In one embodiment, the downloader 208 includes an agent 234, a joiner 236, a decompressor 238, an unpacker 240, a file system structure generator 242, and a writer 244; in the embodiment shown, the writer 244 includes a verifier 246. In alternative embodiments, one or more of the agent 234, decompressor 238, unpacker 240, file system structure generator 242, and verifier 246 are omitted.

If present, the downloading agent 234 operates in a manner compatible with the transmitting agent 224. Either or both agents 224, 234 may be used in a given system 100, and agents 234 may be present on some downloading computers 202 and not present on other downloading computers 202. Downloading may be initiated in response to commands from a user interface, or downloading may be started automatically by the agent 234 in response to a request from the transmitting computer 200.

The joiner 236 monitors the data stream repetitions on the network connection(s) and joins the conversation (that is, begins downloading data to permanent storage) at a join point. Join points are discussed in detail in connection with FIGS. 3 and 5.

If present, the decompressor 238 operates in a manner compatible with the compression techniques used by the transmitter 204 to decompress data downloaded from one or more data stream repetitions. If compression is intermittent or changes dynamically as a result of activity by the speed monitor 228, then the decompressor 238 is configured to operate only on compressed data and to select corresponding decompression levels and methods.

If present, the unpacker 240 operates in a manner compatible with the packer 220 to unpack image file bytes, sectors or clusters downloaded from one or more data stream repetitions. This may involve re-introducing unused (optionally zeroed) sectors or clusters to relocate used sectors or clusters to their original relative positions. Unused sectors or clusters may also be introduced to align the image contents on cylinder boundaries if the target disk 216 has different geometry than the source disk. Unused bytes may also be introduced to align the image contents on sector or other file system boundaries. The image file being unpacked may be based on the image file 210 or it may have been created on-the-fly by the packer 220.

If present, the file system structure generator 242 generates file allocation tables or bitmaps, boot records, partition tables, and other file system structures as necessary for file system administration of the disk image on the target disk 216. In some embodiments, the file system structure generator 242 is not present or is not used because the file system structures needed are part of the data stream transmitted by the computer 200, and will function on the target disk 216 just as readily as they did on the source disk. However, in other cases the file system structures must be partially or entirely generated at the downloading computer 202 to compensate for differences in source and target disk geometry, or to perform on-the-fly partition manipulations, or to handle file-by-file image files 210.

The writer 244 stores the downloaded, unpacked, decompressed, completed disk image (including used sectors or clusters and file system structures) on the target disk 216. Alternatively, compressed data is written and decompressed after all disk image data is downloaded. Confirmation of the individual sector or cluster writes can be provided using standard synchronous or asynchronous protocols, with or without disk caching.

If present, the verifier 246 verifies that all necessary sectors and clusters have been downloaded and stored on the target disk 216. If required sectors or clusters have not been received, and the transmitting computer 200 has stopped transmitting the data stream repetitions, then the writer 244 or the agent 234 may request that the transmitting computer 200 retransmit the missing sectors or clusters. They may request immediate retransmission or they may indicate a willingness to wait for retransmission after the current data stream transmission finishes. Retransmission may occur on one or both of the connections 230, 232.

The downloader 208 may also request additional entire data stream repetitions. If the transmitting computer 200 is still transmitting repetitions, the downloader 208 can simply download the missing sectors or clusters from a subsequent data stream repetition. Sectors and clusters may be identified to the verifier 246 by sector or cluster addresses, so this approach to verification makes it possible to use sector or cluster addresses to verify that required data has been written to the target disk 216.

Transmitting Methods

Figure 3:
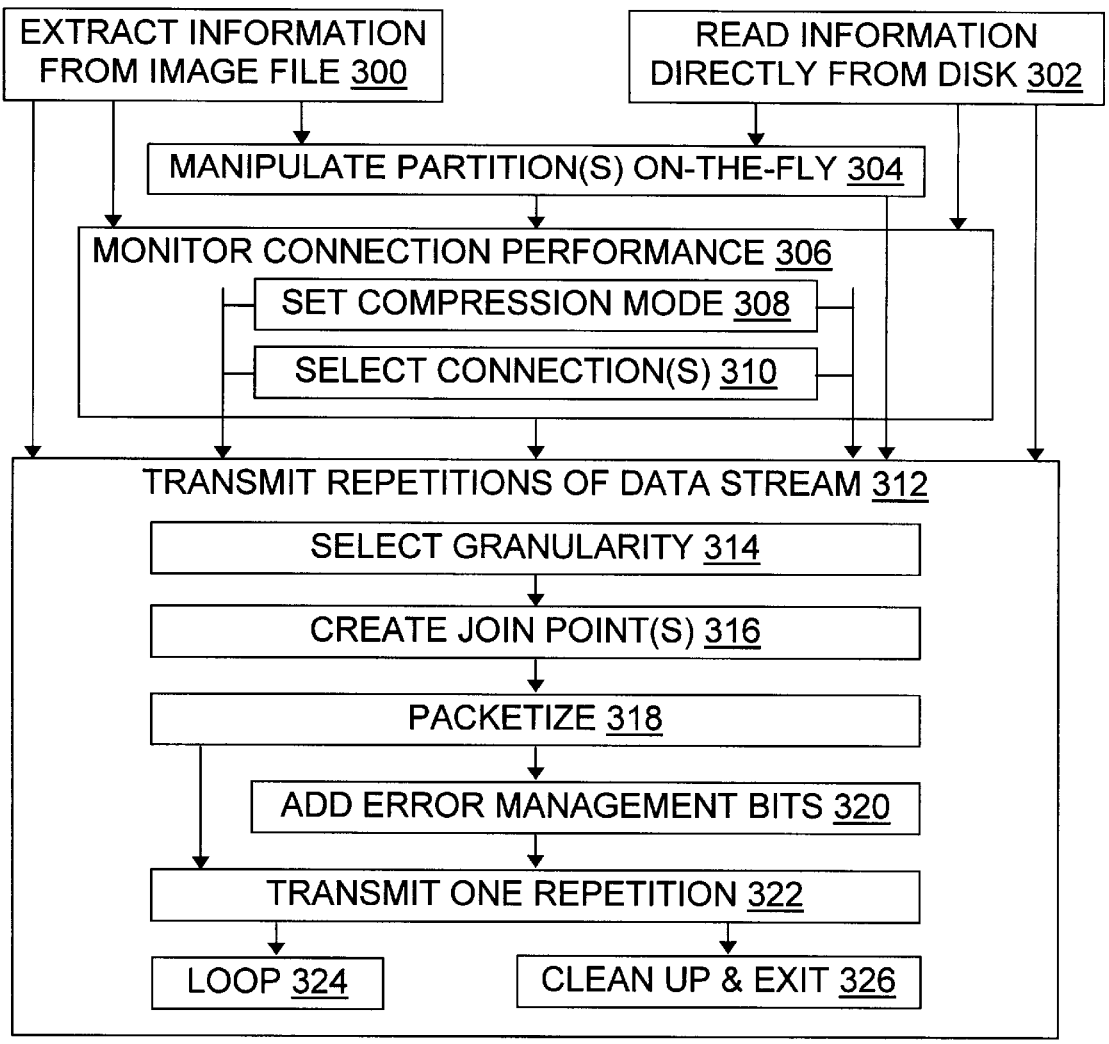
FIG. 3 is a flowchart illustrating methods of the present invention for repeatedly transmitting a disk image in data streams in a network.

FIG. 3 illustrates methods of the present invention for transmitting data streams. Aspects of these methods have already been discussed in connection with the system 100 and the computers 200, 202. Some aspects, such as those pertaining specifically to data stream definitions, are also discussed below in connection with FIG. 5.

During an extracting step 300 or a reading step 302, the system 100 obtains information that includes at least selected user data and accompanying file names and directory hierarchy (directory names and relative locations). The extracting step 300 extracts this information from an image file such as the image file 210, while the reading step 302 reads the information directly from a disk such as the disk 212 or 214 without interpreting image file contents. In either case, the information obtained may include user data from several disk partitions, each of which corresponds to one file system instance.

For example, a disk might contain partitions labeled C: and D:, each of which includes an instance of a FAT file system. However, the information obtained during steps 300, 302 need not include all partitions or file system instances on a disk, and need not include all files in a given file system instance. Moreover, if a file system instance resides in several partitions and/or on several disks, then obtaining information during steps 300, 302 may involve copying information from several partitions and/or several disks.

An optional on-the-fly partition manipulation step 304 manipulates one or more partitions and/or file system instances. For instance, partition sizes may be increased or decreased, and/or cluster sizes may be changed. File systems may also be converted from one format to another, such as between the FAT16 and FAT32 file system formats. The manipulation is said to be "on-the-fly" because it is performed on the information placed in RAM during the step 300 or 302, rather than being performed in place on the disk 212 or 214. The image on the disk 212 or 214 is not changed by the manipulation step 304. Suitable manipulations are described in commonly owned copending U.S. patent application Ser. No. 09/134,883 filed Aug. 15, 1998, incorporated herein by reference.

During an optional performance monitoring step 306, the performance of one or more network connections (such as connections 230, 232) is monitored for changes that exceed predetermined thresholds. The monitoring step 306 may also watch for other predefined events, such as the addition or removal of network nodes 104, 108, or requests for retransmission. If the performance of a connection 106 falls below a predetermined acceptable level, then a compressing step 308 may be performed to compress the data, thereby decreasing the load on the network connection 106. Alternatively, a selecting step 310 may be performed by identifying another connection and beginning transmissions over it, either in place of or in addition to the current connection(s).

The object of the steps 300 through 310 is to support and facilitate a transmitting step 312 which transmits data stream repetitions to downloading computers 202. However, several additional preparation steps 314 through 320 are also useful. These are illustrated as part of the transmitting step 312 because they can be altered dynamically between two repetitions of a data stream signal. However, they could also be documented as separate predecessor steps, in methods which perform them only once to initialize data stream transmissions. Of course, some of these steps 308, 310, and 314 through 320 could also be performed only once while others are subject to dynamic change between repetitions.

A granularity selecting step 314 selects the granularity that governs placement of join points. Join points are points within a data stream at which a downloading computer 202 may join the broadcast or multicast and begin usefully downloading disk image data produced during one or more of steps 300 through 304. Granularity may be byte, sector, or packet granularity. With packet granularity, for instance, all join points fall on a packet boundary.

A join point creating step 316 creates the join points. This may be done by specifying join points explicitly in the data stream, either by listing them, or by inserting information at each join point occurrence to mark the join point. Join points may also be created implicitly. For instance, the computers 200, 202 may be configured to assume that the granularity defines the join points, that is, each possible join point under the specified granularity is indeed an actual join point. If the granularity is packets, this latter approach makes each packet boundary a join point.

During a packetizing step 318 the information produced during one or more of steps 300 through 316 is divided into packets for network transmission. Packetizing is a familiar operation in the art. As is also well-known, an error managing step 320 may be combined with packetizing to include error management bits such as cyclic redundancy codes or other data or control bits that permit error detection and/or error correction in the event of faulty network transmission. In one embodiment, the error managing step 320 includes retransmission of packets, in response to lack of an acknowledgment or in response to an express request for retransmission.

During a repetition transmitting step 322, one repetition of the data stream is transmitted over the network 100 using TCP/IP or other familiar network protocols. In an alternative embodiment, N repetitions are transmitted in sequence by each step 322, where N is a predetermined whole number.

A looping step 324 and/or an exiting step 326 is then performed. The exiting step 326 frees allocated memory, updates status logs, emails a completion message to the user, and/or takes similar steps to clean up and exit, returning control to the operating system or other previous process.

The looping step 324 determines whether to repeat prior steps or exit. The repeated steps are typically the transmitting step 322 and the looping step 324 itself, but one or more of steps 306 through 320 may also be repeated. Suitable decision criteria include those discussed in connection with the loop handler 226.

Downloading Methods

Figure 4:
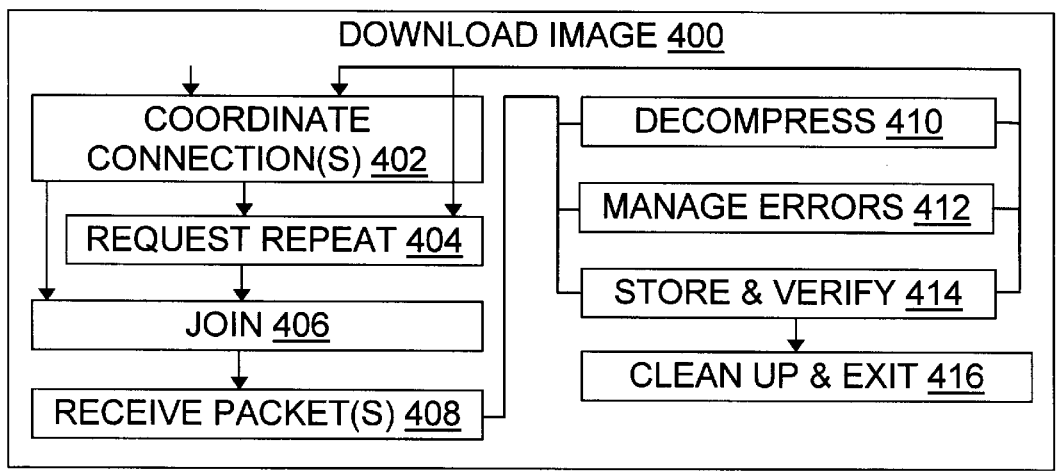
FIG. 4 is a flowchart illustrating methods of the present invention for downloading a disk image.

FIG. 4 illustrates methods of the present invention for downloading a disk image from a series of data stream repetition signals. Aspects of these methods have already been discussed in connection with the system 100 and the computers 200, 202. Some aspects are also discussed below in connection with FIGS. 5 and 6.

During an image downloading step 400, an initial step 402 coordinates with the transmitting computer 200 to determine which network connection or connections should be used. This may be accomplished by control information in the data stream repetitions, by user specified parameters, or by direct communication with the transmitting computer 200.

An optional repeat requesting step 404 requests repetition of data stream transmission or repetition of individual packets. This may be done, for instance, when the downloading computer 202 begins listening in the middle of the last data stream of a given series of data stream repetitions and thus needs at least one additional repetition to complete its copy of the disk image information. It may also be done, in a limited manner, for error recovery.

During a joining step 406, the downloading computer 202 scans the data stream repetitions until it locates a join point in the signal. Broadcast and/or multicast tools and techniques and scanning tools and techniques familiar to those of skill in the art may be used.

During a packet receiving step 408, the downloading computer 202 downloads packets from the join point onward until it has a complete copy of the disk image or the process is terminated. The packets are received and stored in working memory using familiar networking tools and techniques. Packets preceding the join point may be scanned by the downloading computer 202, but will be discarded.

A decompressing step 410 is performed as needed to decompress data in the packets. Decompression proceeds as discussed in connection with the decompressor 238.

An error managing step 412 is performed as needed to detect and correct errors in the packet data. Error management proceeds as discussed in connection with the loop handler 226 and writer 244.

A storing and verifying step 414 stores the disk image information as discussed in connection with the writer 244 and verifier 246. If necessary disk image information is missing and cannot be constructed locally (some information may be constructed by the system structure generator 242), then the storing and verifying step may pass control to the repeat requesting step 404, possibly after a change in connections performed by the coordinating step 402.

An exiting step 416 releases memory, sockets, connections, locks taken to prevent changes to the disk during the steps 300, 302 (depending on available memory, these may have been released sooner), and other resources. It also updates log entries, notifies the user and/or computers 202 of completion (such as by communication between the agents 224, 234), and exits.

Data Stream Signal Format

FIG. 5 illustrates the format of a series 500 of data stream repetitions 502 embodied in at least one network connection such as the connections 106, 230, 232. The number of data stream repetitions 502 in the series 500 is determined by the loop handler 226, and may reflect requests for repetition from one or more downloading computers 202. The entire series 500 may be transmitted over (and hence embodied in) a single network connection 230, or the series 500 may be transmitted over multiple network connections. Each additional connection may carry the same information, or the information in a given data stream 502 may be sent partially over one connection (carrying control information) and partially over another connection (carrying the corresponding controlled data).

A given data stream 502 naturally contains disk image data 504, the transfer of which is the primary purpose of the invention. The disk image data 504 includes user data (user file contents), and corresponding file system and partition table information. Suitable data 504 includes data produced by the image obtainer 206 and/or loop handler 226, and data produced by one or more of the steps 300, 302, 304, 308 described above.

However, the data stream 502 also contains packets 506 marked by packet boundaries or edges 508, as well as join points 510. The data stream may also contain one or more compression sync points 512 and optional control information 514.

The packets 506 and their edges 508 are defined and embodied in the connections 106 by the networking tools and techniques used, in a manner familiar to those of skill in the art. Note that join points 510 may have packet granularity, so that some or all of the packet edges 508 are also join points 510. Packets may appear in a different order in one repetition 502 than in another repetition 502.

The compression sync points 512 are defined and embodied in the connections 106 by the compression tools and techniques used in a manner familiar to those of skill in the art. When sync points are present, it is preferred that each join point 510 fall on a sync point 512 to facilitate decompression.

The optional control information 514 may be used by the coordinating step 402 and/or the speed monitor 228 to specify network connections and/or compression modes. The control information 514 may also contain error management bits, or pack/unpack modes used by the packer 220 and unpacker 240. Finally, it may contain administrative information such as the identity and location of the transmitting computer 200 and the source and version of the disk image.

The control information 514 may be sent zero or more times during a given data stream repetition, on the same wire or on an alternate connection 232. If the control information appears in the data stream repetition 502 more than once, then each appearance may contain the same information, or the different appearances may contain partially or entirely different information. For instance, file allocation table information may be distributed over several control information appearances.

Some Comments on Alternative Embodiments

For ease of illustration, method steps are shown in the Figures even if they may be omitted from some claimed methods. In practice, steps may be omitted unless called for in the relevant claim(s), regardless of whether the steps are expressly described as optional in this Detailed Description.

Likewise, the steps are shown in a particular order even though they may be performed in other orders or concurrently, except when one step requires the result of another step. For instance, the image downloading step 400 might store and verify 414 compressed data and then do decompression 410 afterward. Likewise, the steps of manipulating partitions 304 and monitoring connection performance 306 may generally be done in the order shown, in the opposite order, or in an overlapping (concurrent) manner. Steps may also be repeated, even though the repetition is not shown expressly. For instance, multiple repeat requests 404 may be made. Those of skill in the art will also recognize when descriptions provided for one step or component also pertain to another step or component, thereby making explicit repetition of the description unnecessary. Steps may also be named differently. Finally, observations analogous to those above for method steps apply to the elements of system or storage medium or signal claims.

Although particular methods embodying the present invention are expressly illustrated and described herein, it will be appreciated that apparatus, article, and signal embodiments may be formed according to methods of the present invention. Unless otherwise expressly indicated, the description herein of methods of the present invention therefore extends to corresponding apparatus, articles, and signals, and the description of apparatus, articles, and signals of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

Conclusion

Figure 6:
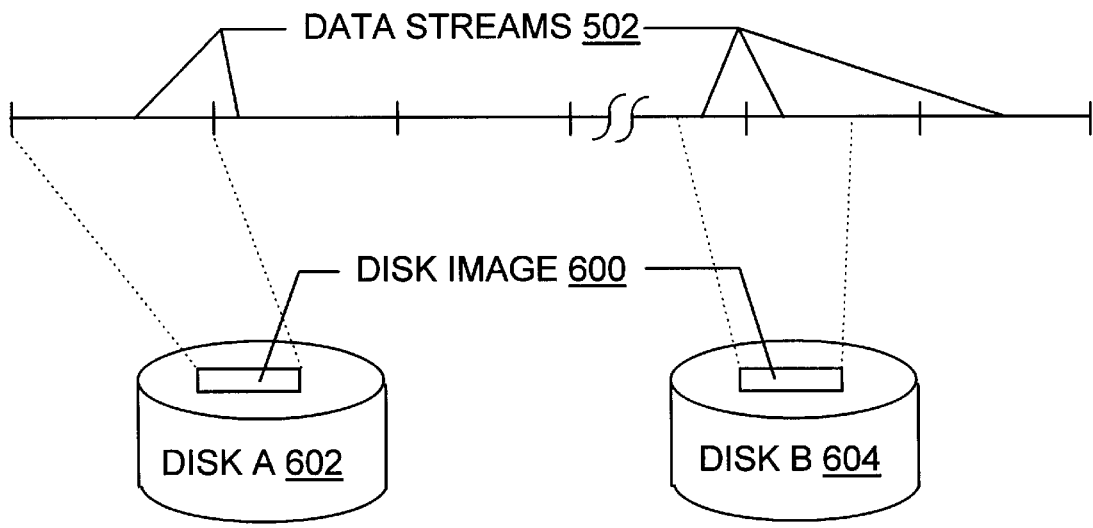
FIG. 6 is a diagram illustrating the downloading of a disk image from one data stream repetition and the downloading of the same disk image from more than one repetition.

The present invention provides tools and techniques for transferring a disk image to several computers 202 in a manner that allows technicians to bring the downloading computers 202 up one or a few at a time. This makes it possible for some computers 202 to be downloading while other computers 202 are being prepared, thereby overlapping setup, download, and shutdown efforts in a way that reduces the total time needed to create images at different locations. As shown in FIGS. 2, 5, and 6, the transmitting computer 200 transmits a series of data stream repetitions 502. A copy of the disk image 600 may be downloaded to a disk 602 in straightforward start-to-finish manner. But a downloading computer 202 can also begin downloading to a disk 604 in the middle of a repetition 502 instead of waiting for the start of the next repetition 502. This ability to start downloading in mid-repetition increases the overlap of required activities and thus provides the benefits discussed above.

What is claimed and desired to be secured by patent is:

1. A method of transferring disk images from one computer to a plurality of computers, comprising the steps of:
   transmitting repetitions of a data stream containing a disk image over at least one network connection, the data stream having a beginning, an end, and at least one join point between the beginning and the end; and
   downloading the disk image to at least two computers, wherein the downloading to at least one computer begins at a join point within a repetition of the data stream and ends in a subsequent repetition of the data stream.

2. The method of claim 1, further comprising the step of extracting the disk image from an image file stored on permanent storage before transmitting any repetitions of the data stream.

3. The method of claim 2, wherein the image file is in a file-by-file format.

4. The method of claim 2, wherein the image file is in a sector-by-sector format.

5. The method of claim 2, wherein the image file is stored on a plurality of removable storage units.

6. The method of claim 2, wherein the image file is stored on permanent storage on a server, the extracting step is performed by the server, and the downloading step downloads the disk image to at least one client of the server.

7. The method of claim 1, further comprising the step of reading the disk image directly from permanent storage without using an image file before transmitting repetitions of the data stream.

8. The method of claim 1, further comprising the step of performing an on-the-fly partition manipulation on at least one partition in the disk image before transmitting repetitions of the data stream.

9. The method of claim 1, further comprising the step of compressing at least a portion of the disk image before transmitting it in the data stream, and the step of decompressing at least a portion of the disk image after downloading it to a computer.

10. The method of claim 9, wherein the compressing step creates at least one compression sync point in the data stream.

11. The method of claim 10, wherein each join point in the data stream coincides with a compression sync point in the data stream.

12. The method of claim 1, wherein the transmitting step transmits disk image data and join points over the same network connection.

13. The method of claim 1, wherein the transmitting step transmits disk image data over one network connection and transmits corresponding join points over another network connection.

14. The method of claim 1, wherein the downloading step downloads the disk image to the same computer that is performing the transmitting step.

15. A computer system for transferring disk images from one computer to a plurality of computers, the system comprising:
- a first computer;
- an obtaining means for obtaining a disk image;
- a second computer connectable to the first computer by at least one network connection;
- a transmit means for transmitting repetitions of a data stream containing the disk image over at least one network connection to the second computer, the data stream having a beginning, an end, and at least one join point between the beginning and the end; and
- a download means for downloading the disk image to the second computer, wherein the downloading to the second computer begins at a join point within a repetition of the data stream and ends in a subsequent repetition of the data stream.

16. The system of claim 15, wherein the first computer is a server and the second computer is a client of that server.

17. The system of claim 15, wherein the first computer and the second computer are peers in a peer-to-peer network.

18. The system of claim 15, wherein the obtaining means comprises a permanent storage device attached to the first computer and a means for reading the disk image from the permanent storage device.

19. The system of claim 18, wherein the permanent storage device comprises a magnetic tape.

20. The system of claim 18, wherein the permanent storage device comprises a CD-ROM.

21. The system of claim 18, wherein the permanent storage device comprises a hard disk.

22. The system of claim 18, wherein the means for reading disk image data comprises a means for reading disk image data from an image file.

23. The system of claim 15, wherein the obtaining means comprises a means for reading only selected files in a partition.

24. The system of claim 15, wherein the obtaining means comprises a means for reading directory information for a predetermined file in a partition and the transmit means avoids transmitting the corresponding file content.

25. The system of claim 15, wherein the network connection comprises a client-server network connection.

26. The system of claim 15, wherein the network connection comprises a file visible to both computers.

27. The system of claim 15, wherein the network connection comprises a TCP/IP connection.

28. The system of claim 15, wherein the transmit means comprises a server agent capable of responding automatically to transmission requests from other computers.

29. The system of claim 15, wherein the download means comprises a client agent capable of responding automatically to download requests from a server.

30. The system of claim 15, wherein the download means comprises a means for verifying receipt of disk image data by verifying that all sectors corresponding to the data have been stored on permanent storage by the second computer.

31. The system of claim 15, wherein the join points have byte granularity.

32. The system of claim 15, wherein the join points have sector granularity.

33. The system of claim 15, wherein the join points have packet granularity.

34. The system of claim 15, wherein the data stream specifies the size of at least one partition in the disk image.

35. The system of claim 15, wherein the data stream specifies at least one address of an alternate network connection which also carries part or all of the data stream.

36. The system of claim 35, wherein the address includes a local area network address.

37. The system of claim 35, wherein the address includes a universal resource locator.

38. The system of claim 15, further comprising a compression means for compressing at least a portion of the disk image before transmitting it in the data stream, and a decompression means for decompressing at least a portion of the disk image after downloading it to the second computer.

39. The system of claim 38, further comprising a dynamic speed monitor which monitors network connection performance and regulates the compression means on detecting a change of predetermined amount in network connection performance.

40. The system of claim 15, further comprising a dynamic speed monitor which monitors performance of at least two network connections and selects between the connections in response to predetermined events that indicate changes in relative network connection performance.

41. A computer storage medium having a configuration that represents data and instructions which will cause at least a portion of a computer system to perform method steps for transferring disk images from one computer to a plurality of computers, the method comprising the steps of:
- transmitting repetitions of a data stream containing a disk image over at least one network connection, the data stream having a beginning, an end, and at least one join point between the beginning and the end; and
- downloading the disk image to at least two computers, wherein the downloading to at least one computer begins at a join point within a repetition of the data stream and ends in a subsequent repetition of the data stream.

42. The storage medium of claim 41, wherein the downloading step identifies a join point using a current sector number included in the data stream.

43. The storage medium of claim 41, wherein the downloading step identifies a join point using a list of sectors included in the data stream.

44. The storage medium of claim 41, wherein the downloading step selects a join point based at least in part on an indication of disk image size which is included in the data stream.

45. The storage medium of claim 41, wherein the downloading step selects a join point based at least in part on compression state information which is included in the data stream.

46. The storage medium of claim 41, wherein the transmitting step comprises including error management bits in the data stream.

47. The storage medium of claim 41, wherein the downloading step comprises sending a retransmission request from a downloading computer to a repetition transmitting computer.

48. A series of data stream signal repetitions embodied in a network connection for transferring disk image data, each repetition of the data stream signal having a beginning, an end, and at least one join point between the beginning and the end, and each repetition of the data stream signal also containing disk image data.

49. The series of data stream signal repetitions of claim 48, wherein each repetition of the data stream signal also contains at least one compression sync point.

50. The series of data stream signal repetitions of claim 48, wherein the disk image data is packed.

51. The series of data stream signal repetitions of claim 48, wherein each repetition of the data stream signal also contains control information identifying another network connection.

* * * * *